July 15, 1952 — T. M. FERRILL, JR — 2,603,779
RADIO GUIDANCE SYSTEM
Filed Dec. 27, 1945 — 2 SHEETS—SHEET 1

INVENTOR
THOMAS M. FERRILL, JR.
BY Paul B. Hunter
ATTORNEY

July 15, 1952  T. M. FERRILL, JR  2,603,779
RADIO GUIDANCE SYSTEM
Filed Dec. 27, 1945  2 SHEETS—SHEET 2
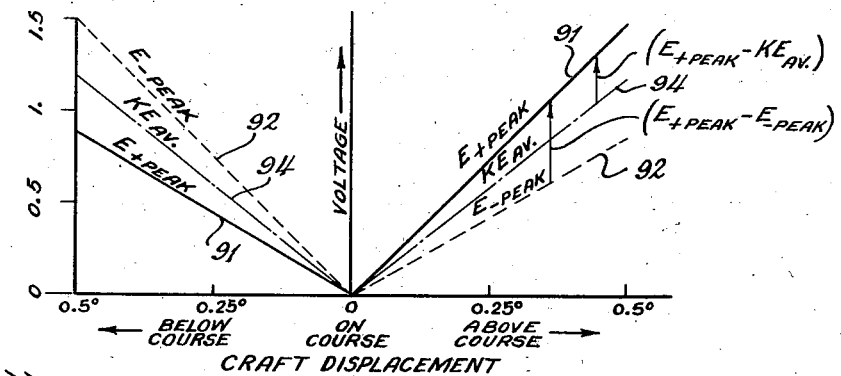
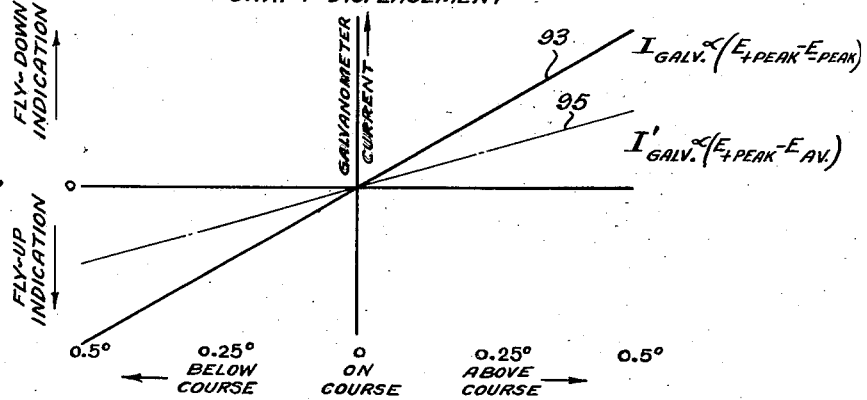
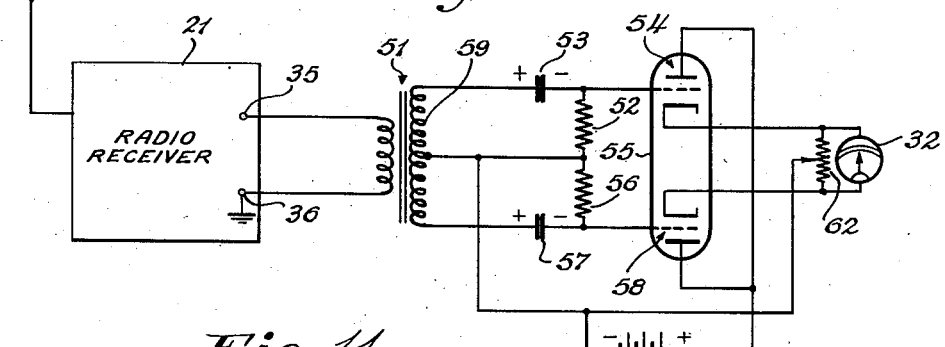
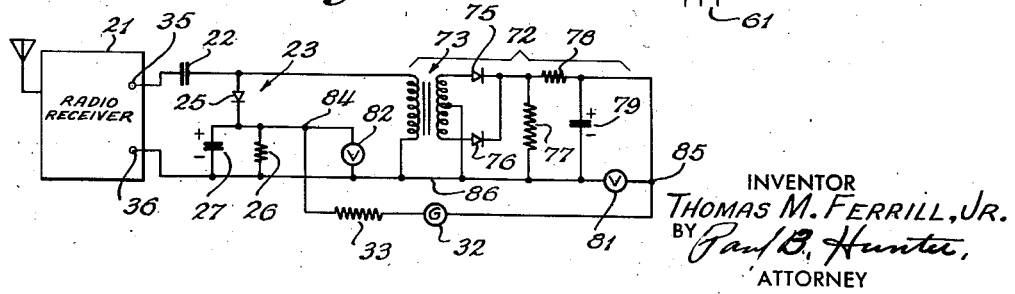
INVENTOR
THOMAS M. FERRILL, JR.
BY
ATTORNEY

UNITED STATES PATENT OFFICE 2,603,779

RADIO GUIDANCE SYSTEM

Thomas M. Ferrill, Jr., Hempstead, N. Y., assignor to The Sperry Corporation, a corporation of Delaware Application December 27, 1945, Serial No. 637,371

3 Claims. (Cl. 343—110)

The present invention relates to radiant energy systems for the guidance of dirigible craft, and is particularly concerned with methods of and apparatus for indicating the position of a craft relative to a pair of divergent directive energy patterns, which may be oriented in space for partially overlapping directivity.

Radiant energy systems employing a radio transmitter with a directive antenna system have been provided for the guidance of dirigible vehicles such as ships and aircraft. For accuracy in defining a desired course for the dirigible craft, the transmitted energy is often divided between two directive radiation patterns or beams aimed in divergent directions, but being of such breadth as to form a region of overlap of energy transmission, such as overlap region containing a zone of equal field intensities of the two directive patterns. The transmission in the patterns is characterized in a manner which makes it possible to distinguish the reception of energy transmitted in one beam from that transmitted in the other beam, and to determine from which directive beam the energy of greater amplitude is received. In such systems, a radio receiver is carried by each craft which is to be navigated in reliance upon the spatial distribution of the directive beam energy. The operator in the craft aurally or visually determines the craft position relative to the directive beam or beams by the use of headphones or by use of a visual indicator suitably coupled to the radio receiver.

In some instances, the transmission in each beam is interrupted at such a series of relatively long intervals that Morse code impulses are formed. Such systems have been arranged for "interlocking" transmission in the two beams, as with the code elements of the letters "A" and "N," or with a series of E's (Morse dots) transmitted in one beam and a series of T's (Morse dashes) transmitted in the other beam. The code impulses transmitted in one directivity pattern or beam are timed in exact coincidence with the intervals between the impulses transmitted in the other pattern or beam.

In the use of a dual-beam radio navigation system employing interlocking code identification of the beams, the operator of the craft wears a pair of headphones connected to the radio receiver, and translates the Morse code received from a selected station to determine his position relative to the equisignal zone defined by the two directive beams. When the craft arrives at the equisignal zone, which usually defines a predetermined path for the craft to follow, the series of code impulses received through one beam are of equal strength to the series of code impulses received through the other beam, and since the impulses of the first beam are coincident with the intervals between the code impulses of the other beam, the receiver provides a continuous note or tone in the headphones, and no code impulses are heard by the craft operator. The continuous note indicates that the craft is in the equisignal zone of the directivity patterns, and is thus on the predetermined course defined by the directive transmitting system.

Several attempts have been made to provide visual indicators adapted to supplement or to replace the aural code determination of craft position relative to the "A-N" and "E-T" systems. Special electromechanical code translators have been devised for this purpose, and attempts have been made to employ non-linear detector and galvanometer apparatus for the purpose of providing visual indication of craft position. The electromechanical code translators proved generally impracticable. The non-linear detector schemes, while able to afford substantially unambiguous indications for great departures from course, were inherently so non-linear in instrument deflection current relative to departure from course as to render such systems unsuited for craft guidance. The need for visual indication was so strongly felt that the Morse code system of beam identification was in many instances discarded altogether and replaced by visual-indication systems employing modulation of divergent radio beams at different selected audio frequencies. In one system, the beams were modulated at respective frequencies of 90 and 150 cycles per second; in another, they were modulated at 600 and 900 cycles per second.

In one early system employing beams modulated at different frequencies, visual indicators employing a plurality of resonant reeds placed side by side were provided for indicating to the craft operator the sense and extent of departure from the equisignal course. As these indicators did not prove entirely satisfactory, they were superseded by electrical frequency selective systems. In an indicating arrangement of this type, a plurality of band-pass filters were employed, one for each beam modulation frequency, and each filter was connected to an output rectifier. The rectified output voltages were opposed to operate a zero-center galvanometer.

The use of frequency-selective filters and rectifiers operating a galvanometer according to the relative strengths of signals received through two beams or directivity patterns of radiant energy modulated at different frequencies has been almost universally adopted for visual-indication radio navigation systems. This indicating arrangement has the disadvantages that the frequencies of modulation of radio energy transmitted through the two beams must be maintained substantially constant, to avoid variation of attenuation in the frequency-selective filters and consequent apparent shifts of the indicated course. Also, the audio-frequency modulation is ordinarily afforded by an energy-absorption modulator, so that the beam modulation usually is provided at some sacrifice of the generated power. Moreover, band-pass filters meeting the stringent requirements for reliable performance in radio navigation systems ordinarily are cumbersome and expensive, and their use results in appreciable loss of receiver output power.

Various attempts have been made to overcome these disadvantages of differential-frequency beam modulation systems by the use of oppositely phased modulations of the beams at a single frequency, and phase detection of the signal produced by detection and amplification of the energy transmitted through the directive radio beams. The systems which have been proposed for oppositely-phased modulations comprehend transmissions of equal-duration impulses alternately in one beam and the other beam, together with the transmission of a phase-reference signal to the craft. The phase-reference signal has been communicated to the craft by a separate radio channel. Such opposite-phase modulation systems, however, have involved such complexity of transmitting equipment and receiving and indicating apparatus that they have been generally abandoned, and the systems employing distinctive modulation frequencies have remained in general usage.

An object of the present invention is to provide a simple, reliable and inexpensive system and apparatus for the identification of the directive radio beams and for providing an unambiguous measure of the position of a craft relative to a course defined by the beams.

Another object of the present invention is to provide an improved system for economical and efficient visual indication of craft position relative to a pair of divergent radio beams.

More specifically, it is an object of the present invention to provide a simple radio position indicating system characterized by steady, unambiguous, and substantially linear deflection of a visual indicating instrument; by efficient use of generated radio-frequency energy; by freedom from close-tolerance requirements as to transmitter output modulation frequency; and by simplicity, economy, compactness and light weight of the position detection components associated with the receiver.

A further object of the invention is to provide apparatus and instrumentalities embodying novel features and principles, adapted for use in realizing the above objects and also adapted for use in other fields.

The invention in another of its aspects relates to novel features of the instrumentalities described herein for achieving the principal objects of the invention and to novel principles employed in those instrumentalities, whether or not these features and principles are used for the said principal objects or in the said field.

According to a major feature of the present invention, radiant energy such as ultra high frequency radio energy is transmitted in one and then the other of two divergently-aimed antenna directivity patterns, the alternation between the patterns being accomplished at a relatively high frequency, and the time duration of the transmission impulses in one of the directivity patterns being appreciably greater than the duration of the impulses transmitted in the other directivity pattern. A radio receiver carried by a craft and tuned to the transmitted energy receives a substantially unmodulated signal when the craft is in the zone of equal radio-frequency signal intensities of the two beams. When the craft is displaced in a first direction or sense from this zone, the receiver produces an alternating output voltage characterized by short-duration, flat-topped, high-potential positive peaks or maxima separated by long-duration, flat-topped, low-potential negative peaks or maxima. When the craft is displaced in the opposite direction or sense from the equisignal zone, the receiver produces an alternating output voltage characterized by positive peaks of long duration and low potential, separated by negative peaks of short duration and high potential. Two rectifying circuits are coupled to the receiver for producing two direct voltages of magnitude varying according to the magnitude of the alternating output voltage of the receiver; and a zero-center galvanometer or other utilization device is connected to the rectifying circuits for providing an indication of the relative magnitudes of the rectified voltages. One of the rectifier circuits is arranged as a peak-voltmeter circuit, which may include a half-wave rectifier element and a resistance-capacitance storage and biasing circuit coupled thereto. The other rectifier circuit may be similar to the first, with the half-wave rectifier element connected for response to voltage peaks of the polarity opposite that to which the detector element of the first rectifier circuit is responsive; or it may be a type of rectifier circuit independent of asymmetry of positive and negative voltage peaks, e. g., a circuit producing a direct output voltage of strength dependent directly upon the effective value of the alternating voltage.

The effective value of the alternating voltage produced by the receiver varies substantially linearly with displacement of the craft in either sense from the equisignal zone of the two directivity patterns or beams. The positive- and negative-peak amplitudes of the voltage vary linearly with displacement from the equisignal zone or course, but the positive-peak amplitude is greater than the negative-peak amplitude for a craft displacement in a first sense, and smaller than the negative-peak amplitude, by an equal ratio, for a displacement in the opposite direction or sense from the equisignal zone. Thus, if a zero-center galvanometer or other utilization device is connected to compare the direct output voltages of two opposed peak voltmeters, it will be subjected to an actuating current whose direction of flow corresponds to the direction or sense of displacement from course, and whose magnitude varies substantially linearly with the extent of the craft displacement from course. A corresponding result is obtained if the galvanometer or other utilization device is connected between the output terminals of a half-wave peak-voltmeter type rectifying circuit and a rectifier circuit arranged to deliver equal voltages for equal craft displacements in opposite directions or senses, these voltages being exceeded in a predetermined ratio by the direct output voltage of the peak-voltmeter rectifying circuit when the craft is displaced in one direction from the equisignal zone, and being in excess of the direct output voltage of the peak-voltmeter rectifying circuit by an equal ratio when the craft is displaced in the opposite direction from the equisignal zone.

The above features of the present invention will be readily understood and other objects will become apparent from the following description of illustrative embodiments of the invention, considered in conjunction with the drawings, wherein:

Fig. 1 shows a radio system for vertical guidance of aircraft along a desired instrument landing path or course;

Fig. 2 schematically shows a transmission system adapted for transmitting distinguishable upper and lower glide-path beams;

Figs. 7 and 8 are graphs illustrating the principles of operation of the present invention;

Fig. 10 illustrates a further modification of the craft position indicating system; and Fig. 11 illustrates a modification of the present invention employing an asymmetrically-responsive rectifier circuit in opposition to a symmetrically-responsive rectifier circuit.

Figure 1:
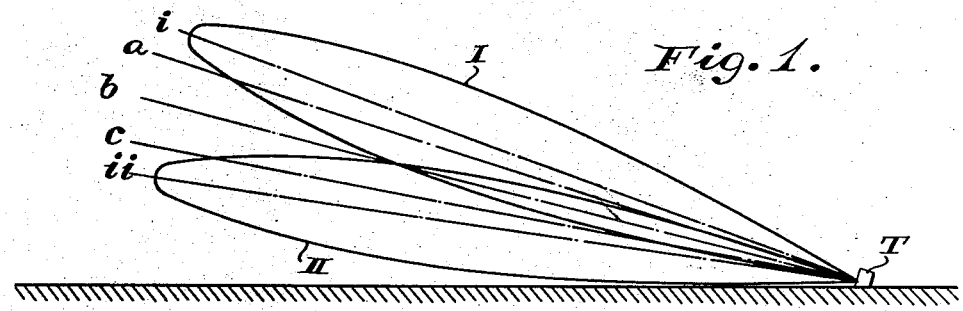

In Fig. 1 there is shown in vertical cross-section a pair of radio energy directivity patterns I and II. The energy transmitted in these patterns or "beams" emanates from a transmitter T employed for defining a radio instrument-landing glide-path for aircraft. The angular widths of the directivity patterns are exaggerated for clarity of illustration. Actually, such directive patterns or beams may be of the order of 2° to 3° in vertical cross-sectional angular extent, the axes $i$ and $ii$ of such beams ordinarily being symmetrically disposed respectively above and below an axis $b$ of equal beam intensities. This axis $b$ represents the desired line of descent of aircraft to the edge of an airport. Such a line of descent to the airport preferably is inclined at an angle of 2° to 2½°, according to the obstructions in the vicinity of an airport, and according to the landing characteristics of the aircraft landing in reliance upon the system.

In accordance with a feature of the present invention, radio-frequency energy from the transmitter T is transmitted alternately in the upper beam I and the lower beam II, the transmission in the upper beam constituting a series of impulses each including a train of radio-frequency oscillations, and the transmission in the lower beam similarly constituting a series of impulses each including a train of radio-frequency oscillations. The oscillations of the lower-beam impulses are maintained during the interval between two successive impulses of the upper beam. The duration of the upper-beam impulses is purposely made unequal to the duration of the lower-beam impulses, in order that position-indicating circuits involving a peak-voltmeter rectifier arrangement may be employed for indicating the relative intensities of the radio-frequency oscillations received through the upper beam and the radio-frequency oscillations received through the lower beam.

Figure 2:
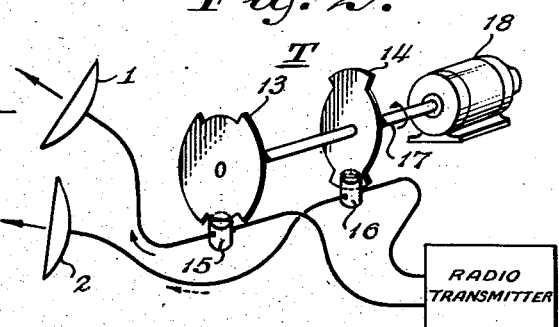

Referring now to Fig. 2, the transmitting station T may comprise a radio transmitter 10 coupled to an upper-beam directive radiator 1 and a lower-beam directive radiator 2 for generating the upper and lower beams I and II, respectively, the coupling of the transmitter to each of the directive radiators being accomplished through an electromagnetic switch or modulator. The switches or modulators may include serrated discs 13 and 14 cooperating respectively with cavity resonators 15 and 16 interposed between transmitter 10 and the directive radiators 1 and 2, respectively. Serrated discs 13 and 14 may be arranged on a common shaft 17 and may be driven by a disc-rotating motor 18. The relative angular positions of the discs 13 and 14 on shaft 17 are so arranged that switch 13, 15 arrests the transmission of radio frequency energy through directive radiator 1 while switch 14, 16 permits the radiation of energy in pattern II through directive radiator 2; and conversely, switch 13, 15 permits the transmission of energy in pattern I by directive radiator 1 while the switch 14, 16 prevents the transmission of energy through directive radiator 2.

Figure 3:
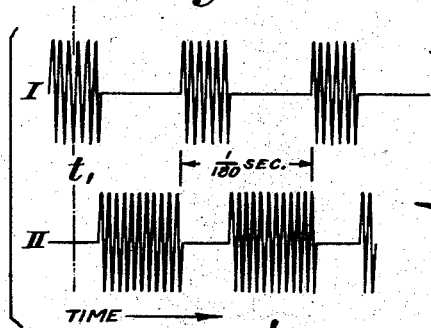
Fig. 3 illustrates the alternation between one and the other of the transmitted beams and the unequal lengths of transmission impulses therein.

In Fig. 3 are indicated at I and II, respectively, the successive impulses transmitted in the upper beam and the successive impulses transmitted in the lower beam, the impulses of the two beams being shown in relation to a common time base or axis of abscissae. Each of the switches or modulators 13, 15 and 14, 16 may be arranged for preventing transmission of energy when an enlarged-radius sector of a disc is passing through the cavity resonator. At the instant when the discs 13 and 14 are in the positions in which they are illustrated in Fig. 2, transmission is thus being effected only through the upper beam generating radiator 1, as at time $t_1$ in Fig. 3.

As will clearly be seen from an examination of the apparatus shown in Fig. 2, the enlarged-radius sectors of disc 13 are of relatively great angular extent, providing for relatively long intervals between the brief successive impulses transmitted in the upper directive pattern or beam I. The enlarged-diameter sectors of disc 14 are of relatively small angular extent, corresponding roughly to the angular extent of the small-radius sectors of disc 13, for providing relatively short intervals between the long-duration impulses transmitted in the lower beam II of Fig. 1. Modulating and switching arrangements involving serrated discs cooperating with cavity resonators in the manner of the units 13, 15 and 14, 16 (Fig. 2) are described in greater detail in U. S. patent application S. N. 444,668, filed May 27, 1942 by D. F. Folland et al., now Patent No. 2,426,992, issued September 9, 1947.

While each of the sector discs 13 and 14 is arranged for the transmission of two impulses per revolution, this construction is only illustrative. Each sector disc may be arranged for one impulse and one interval per revolution, or may be arranged for the transmission of more than two impulses per revolution, as desired.

Figure 4:
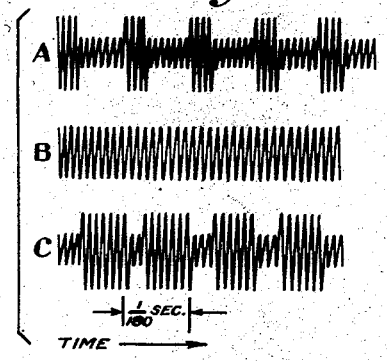
Fig. 4 illustrates the composite radio signals received by the radio receiver at various indicated positions of the craft relative to the path-defining beams.

In Fig. 4 are shown time-representations of radio-frequency field energy at different positions relative to the upper and lower beams I and II of Fig. 1. Fig. 4-A shows a radio-frequency energy plot characterized by alternations between relatively short impulses or trains of radio-frequency oscillations of high intensity and long intervening impulses or trains of radio-frequency oscillations of relatively low intensity. This plot represents the radio-frequency energy which is received by a radio receiver on board an aircraft approaching the transmitter T along the line $a$ in Fig. 1.

If the craft approaches the transmitter T along the desired instrument landing glide path $b$, which is defined by the zone of equal radio-frequency field intensities of beams I and II, the radio-frequency energy received by the radio receiver on board the craft will appear to be unmodulated, as represented in Fig. 4-B. If the craft is below the glide path, as for example, if it is travelling along the line $c$ in Fig. 1, the radio-frequency energy received will be as represented in Fig. 4-C. The modulation envelopes of the radio frequency signals in Figs. 4-A and 4-C are generally similar, except that there is an effective polarity reversal relation between them.

Figure 5:
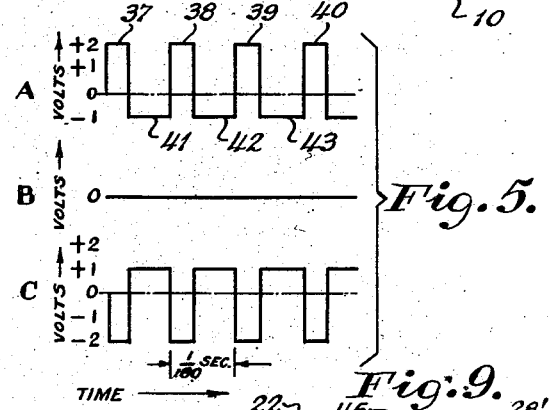
Fig. 5 illustrates the detected audio-frequency output of a receiver at the various positions corresponding to the received signals shown in Fig. 4.

Upon detection and amplification of these signals, there are produced alternating voltages as illustrated in Figs. 5-A and 5-C, respectively, the wave forms of the alternating voltages being similar, but being reversed as to relative polarities. The wave form in Fig. 5-C consequently appears as a mirror-image of the wave form in Fig. 5-A. When the craft is on course, no alternating output voltage is produced, as indicated in Fig. 5-B.

In the alternating voltage wave illustrated in Fig. 5-A, the positive peaks or maxima are of appreciably shorter duration than the negative peaks or maxima of the wave, and accordingly, the positive peak amplitude of this wave is appreciably greater than the negative peak amplitude. This condition corresponds with a craft displacement above the course $b$ (Fig. 1), e. g., with a craft position on line $a$.

When the craft is displaced from the course in the opposite direction, however, there is produced a voltage as represented in Fig. 5-C, wherein the negative peak amplitude is appreciably greater than the positive peak amplitude. The amplitude of the shorter-duration peaks or maxima is higher than that of the longer-duration peaks or maxima of opposite polarity, in inverse proportion to the ratio of time durations of the peaks or maxima. This will be readily understood as consistent with the requirement that the time integration of the instantaneous positive values of voltage in each cycle of the alternating-voltage wave must be equal to the time-integration of the negative values of voltage in the cycle.

Referring to Fig. 5 it will be noted that for a condition of departure from the landing glide path $b$, the output voltage has a rectangular shape with the peaks thereof provided with flat-topped configurations.

Figure 6:
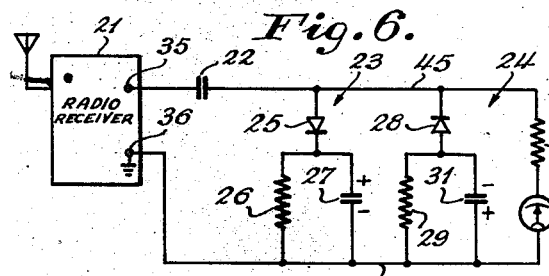
Fig. 6 illustrates an instrument landing receiving system including opposed peak-voltmeters coupled to a craft position indicating galvanometer.

In Fig. 6 there is shown a radio receiver 21 arranged to supply an alternating output voltage through a coupling capacitor 22 to a pair of opposed peak voltmeter type rectifying circuits 23 and 24. Peak voltmeter circuit 23 comprises a rectifier 25 connected in series with an energy storage circuit including a resistor 26 and a capacitor 27 connected in parallel. The peak voltmeter circuit 24 comprises a rectifier 28 connected in series with an energy storage circuit including a resistor 29 connected in parallel with a capacitor 31.

The resistance values of resistors 26 and 29 preferably are equal, and similarly the capacitance values of capacitors 27 and 31 are equal. The relative values of resistance and capacitance in the storage circuits are selected for a time constant which is appreciably greater than the period of alternation between the upper and lower beams. In this illustrative circuit arrangement the peak voltmeter circuits 23 and 24 are connected in parallel, so that the full alternating output voltage of receiver 21 is applied to each. The term "peak voltmeter" as applied to circuits 23 and 24, is employed in reference to the relation between direct output voltage and applied voltage, the direct output voltages of these circuits being substantially equal to the peak voltage amplitudes of the respective polarities to which they are responsive.

The rectifiers 25 and 28 are connected in opposite conduction senses, in order that one of the rectifiers, e. g., rectifier 25, will be responsive to positive peaks of the output alternating voltage and the other will be responsive to the negative peaks of the same voltage. The rectifiers connected in this manner may be said to constitute an opposed rectifying circuit. A galvanometer 32 is connected in series with a resistor 33, and the series combination 32, 33 is connected in parallel with the opposed peak voltmeter circuits 23 and 24. If desired, a microammeter may be connected in series with each of resistors 26 and 29, and these galvanometers can be calibrated for indicating the direct voltages stored in circuits 26, 27 and 29, 31, these voltages being substantially equal to the respective peak voltages to which the respective peak voltmeter circuits 23, 24 are responsive. Such individual peak voltage indicating galvanometers, however, are not essential to the present system, since galvanometer 32 provides directly a comparison of the opposite-polarity peak voltages.

Let it be assumed that the voltage wave shown in Fig. 5-A represents the time-variations of alternating output potential at receiver output terminal 35 relative to receiver output terminal 36. Rectifier 25 will permit the flow of unidirectional charging currents to the storage circuits 26, 27 during the positive peaks 37, 38, 39 and 40 of the wave, while the rectifier 28 will permit the flow of unidirectional charging currents during the negative peaks 41, 42 and 43. As a result of these currents, there is maintained across storage circuit 26, 27 a direct voltage of the polarity indicated in Fig. 6 and of magnitude slightly lower than the positive peak voltage magnitude arbitrarily represented as substantially two volts in Fig. 5-A; and similarly, there is maintained across storage circuit 29, 31 a direct voltage of the opposite polarity, and of an appreciably smaller magnitude corresponding to the smaller magnitude of the negative peak amplitude in Fig. 5-A. By virtue of this inequality of the direct voltages maintained across the storage circuits 26, 27 and 29, 31, the direct currents flowing through resistors 26 and 29 will be unequal, the current through resistor 26 being proportionately greater than the current through resistor 29.

This condition can exist only if there is a current flowing in a further path between conductors 45 and 46, the average magnitude of which is equal to the difference of magnitudes of the currents through resistors 26 and 29, and the direction of which is similar to the direction of the smaller of the currents through resistors 26 and 29. This follows from the fact that the energy storing circuits are each comprised of a resistor and capacitor, the latter element forming an effective blocking device for the direct currents produced in the rectifying portions of the circuit. Inasmuch as different voltages are developed on the condensers of the energy storing circuits, direct currents of unequal magnitude will be made to flow through the resistors 26 and 29, as well as a current having a value equal to the difference of these currents through another portion of the circuit. Galvanometer 32 in series with resistor 33 provides the path for this "difference current." The direction of deflection of the galvanometer pointer from its neutral position indicates the direction of current flow through the path 32, 33 while the magnitude of this deflection indicates the average magnitude of this current flow.

When the instantaneous polarities of the receiver output wave are reversed as in Fig. 5–C, due to displacement of the craft below the course, the negative peak voltage exceeds the positive peak voltage, and a larger voltage is produced across resistor 29 than that produced across resistor 26. Under these conditions a "difference current" must again flow through resistor 33 and galvanometer 32, but in the opposite direction. Accordingly, the direction of current flow through the galvanometer 32 is unambiguously indicative of the sense or direction of departure of the craft from the course. When the craft is on course, the received radio-frequency energy is unmodulated so that no alternating voltage is produced at the receiver output terminals, and accordingly, the pointer of indicator 32 is then neutrally positioned.

As the displacement of the craft from the course increases, the average amplitude of the receiver output alternating voltage increases substantially proportionately, so that the extent of the deflection of the galvanometer pointer from its neutral position indicates substantially linearly the extent of the craft departure or displacement from course. Figs. 7 and 8 graphically depict the manner in which the apparatus in Fig. 6 produces a galvanometer deflection unambiguously and linearly indicating the direction and extent of craft displacement from the course. Plot 91 represents the variation of positive-peak amplitude and plot 92 represents the variation of negative-peak amplitude of the receiver output alternating voltage with variation of craft displacement from the equisignal zone or course. These variations are substantially linear with displacement in either direction from the course. The right-hand portion of plot 91 has a slope substantially double the slope of the right-hand part of plot 92, while the left-hand portion of plot 92 has a slope equal to that of the right-hand portion of plot 91, and substantially double the slope of the left-hand portion of plot 91.

The galvanometer current at any displacement from course is proportional to the algebraic difference of the positive-peak voltage and the negative-peak voltage. In Fig. 8, plot 93 represents the variation of the intensity and polarity of current through galvanometer 32 (Fig. 6), and hence the variation of the galvanometer needle deflection with craft position. Since the positive-peak amplitude and the negative-peak amplitude of the receiver output alternating voltage vary substantially linearly with displacement from course, and the direct voltages stored in circuits 26, 27 and 29, 31 vary accordingly, the current through galvanometer 32, being proportional to the difference of voltages in circuits 26, 27 and 29, 31, must vary linearly, in the manner indicated by plot 93 (Fig. 8). A linearly responsive galvanometer 32 is accordingly enabled to provide ideal craft positional indication, such that a pilot may accurately operate the craft entirely in reliance thereon.

Figure 9:
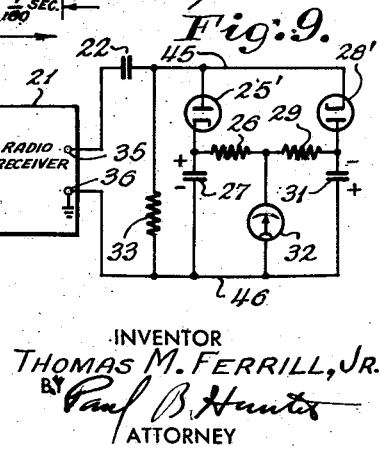
Fig. 9 illustrates an alternative circuit for the opposed peak voltmeters and indicator.

The present invention lends itself readily to a variety of modifications. Vacuum tube rectifiers 25' and 28' may be employed in opposed peak-voltmeter-type rectifying circuits, as illustrated in Fig. 9. The indicating galvanometer 32 may, if preferred, be connected between conductor 46 and the junction of resistors 26 and 29, and resistor 33 may then be connected directly between conductors 45 and 46. The essential features of the operation of the circuit in Fig. 9 correspond generally to those described in detail above for the indicating circuit shown in Fig. 6, the galvanometer 32 again being employed to indicate the sense and extent of the difference of average current intensities through the peak voltmeter storage circuit resistors 26 and 29.

An alternative circuit arrangement providing similar features, but including vacuum-tube amplification, is illustrated in Fig. 10. The radio receiver 21 is here shown coupled through a transformer 51 to the grid-cathode circuits of a pair of triodes, which may be portions of a single vacuum tube or may be individual triode vacuum tubes.

A first peak voltmeter resistance-capacitance storage circuit including a resistor 52 and a capacitor 53 is connected in the grid circuit of the first triode 54, and a further resistance-capacitance storage circuit including a resistor 56 and a capacitor 57 is connected in the grid circuit of the other triode 58. The grids of triodes 54 and 58 are supplied in opposite polarities by a center-tapped secondary winding 59 of transformer 51. The grid-cathode circuit of triode 54 acts as a rectifier and functions as a positive-peak voltmeter in cooperation with capacitor 53 and resistor 52. The grid-cathode circuit of triode 58 similarly functions as a negative-peak voltmeter in cooperation with capacitor 57 and resistor 56.

The anodes of the triodes 54 and 58 may be connected as shown to the positive terminal of a direct voltage source 61, whose negative terminal is connected to the transformer secondary center-tap and to the intermediate tap of a potentiometer 62 connected between the cathodes of the triodes.

An indicating meter or zero-center galvanometer 32 is connected between the cathodes of the triode sections, and is employed for indicating the difference of the voltage drops produced between the intermediate tap of the potentiometer 62 and the ends thereof, due to the difference of cathode currents flowing through triodes 54 and 58.

Due to the rectifier action of the grid-cathode circuit of triode 54, a direct voltage is developed across capacitor 53 when an alternating output voltage is produced between the output terminals of radio receiver 21. A direct voltage is similarly produced across capacitor 57. Each of these capacitor voltages is so polarized as to maintain the associated grid negatively biased with respect to the corresponding cathode. The magnitudes of the bias voltages across capacitors 53 and 57 are different, however, when the negative-peak amplitude of the receiver output voltage is different from the positive-peak amplitude thereof. When the craft is above the instrument landing glide path, the negative bias potential developed across capacitor 53 exceeds the negative bias potential developed across capacitor 57; and when the craft is displaced in the opposite direction from the signal path, the bias potential developed across capacitor 57 exceeds that across capacitor 53. The relative cathode currents of the two triode sections are correspondingly of different magnitudes, and thus, the galvanometer 32 connected between the cathodes of the triodes 54 and 58 is deflected in sense and extent according to the sense and magnitude of the craft displacement from the course.

In each of the foregoing embodiments of the present invention the craft position indicating galvanometer has been employed for comparing the negative peak voltage with the positive peak voltage of the asymmetrical alternating voltage wave resulting from reception of alternate radio-frequency energy impulses of different intensities. Some of the features of the present invention may be realized by comparing a first direct voltage varying as the amplitude of peaks of a selected polarity of the receiver output alternating voltage, with a further direct voltage varying as the average or the maximum of the positive and negative peak voltages or as the average effective value of the alternating output voltage.

In Fig. 11 is shown a radio receiver 21 supplying its alternating output voltage through a coupling capacitor 22 to a positive peak voltmeter 23 and to a rectifier circuit 72 arranged for indicating the average effective value of the alternating voltage wave. Circuit 72 comprises a transformer 73 having a center-tapped secondary winding connected to a pair of rectifier elements 75 and 76. Transformer 73 and rectifier elements 75 and 76 cooperate as a full-wave rectifier system, and supply a rectified voltage to a load resistor 77. A resistance-capacitance filter including a series resistor 78 and a capacitor 79 may be connected across resistor 77, and a D. C. voltmeter 81 may be connected across capacitor 79 for providing a visual indication of the full-wave rectifier output. A second D. C. voltmeter 82 may be connected across the resistance-capacitance storage circuit 26, 27 of peak voltmeter 23, if desired, for providing an indication of the amplitude of output voltage peaks of a chosen polarity, e. g., of the positive voltage peaks. The craft position indicating galvanometer 32 and the resistor 33 in series therewith may then be connected between the positive output terminal 84 of the peak voltmeter 23 and the positive output terminal 85 of voltmeter circuit 72, and the negative output terminals of circuits 23 and 72 may be connected together, as by a conductor 86.

With this circuit arrangement, galvanometer 32 and series resistor 33 together function as a zero-center D. C. voltmeter for indicating the difference of voltages registered by the peak voltmeter 23 and the average effective voltmeter circuit 72.

Effective voltmeter 72 may be converted to a peak voltmeter adapted for control by either positive or negative peaks of the alternating output wave, whichever may be stronger, by making the resistance value of resistor 78 very small compared to those of resistors 77 and 33, or by eliminating resistor 78. With this arrangement, where the positive and negative peaks of the alternating voltage are unequal, only that one of the rectifier elements 75 and 76 responsive to the polarity of the higher voltage peaks will conduct the charging currents necessary to maintain capacitor 79 charged to a direct voltage substantially equal to the maximum peak amplitude of the alternating voltage supplied by receiver 21.

A voltmeter 72 symmetrically responsive to both positive and negative peaks of alternating voltage, or responsive to the average effective value of alternating voltage, provides voltage measurements independently of the polarities of peaks in the asymmetrical wave of alternating voltage at the output of the receiver. Thus, voltmeter 72 provides equal voltage measurements at equal displacements of the craft above and below the course $b$ (Fig. 1). The turns ratio of primary and secondary windings of transformer 73 may be such that the voltage across voltmeter 81 may be made equal to the mean of the voltages across voltmeter 82 at displacements of equal angular magnitudes above and below the course.

The principles of operation of the indicating system shown in Fig. 11 may be compared to those of Fig. 6 by reference to the graphs in Figs. 7 and 8. In Fig. 7, plot 94 represents the variation of D. C. output voltage measured by voltmeter 81 as the craft moves from a position far below the course to a position far above the course. Plot 91 in Fig. 7, as hereinbefore pointed out, represents the variation of positive peak voltage amplitude with the craft position as the craft moves through the indicated displacement range.

In the circuit arrangement shown in Fig. 11, the craft position galvanometer 32 is arranged to indicate the variation with craft position of the algebraic difference between the direct voltage across voltmeter 82 (which varies as the positive peak voltage represented by plot 91) and the direct voltage $kE_{av}$ across voltmeter 81 (varying symmetrically with displacements above and below course, as illustrated by plot 94).

The current $I'$ galv. through galvanometer 32 is represented by plot 95 (Fig. 8), and, for a given alternating output voltage from receiver 21, is of substantially one-half the intensity of the current $I_{galv}$ flowing through the galvanometer 32 in the circuits of Figs. 6 and 7.

From the foregoing description and explanation of operation of the circuit arrangement shown in Fig. 11, it will be seen that the principal advantages of the present invention may be realized with a single peak voltmeter rectifying circuit arranged for output comparison with a symmertically-responsive voltmeter circuit. Such an arrangement, however, involves slightly greater complexity and slightly less sensitivity than the arrangements employing a pair of oppositely-sensed peak voltmeters.

The electrical characteristics of the capacitors and resistors used in the energy storage circuits associated with the rectifier elements are determined according to the frequency of the impulses transmitted. For best results, the storage capacitors must be of capacitance values inversely proportional to the frequency of the transmission impulses. In order that these components may be of such small capacitance values that they may be made relatively compact, an appreciable impulse modulation frequency, e. g., 180 cycles per second, is selected for the system. This frequency is not critical; a practicable system may be built for any frequency within the audible range or the supersonic range of frequencies. Such high impulse frequencies preclude the aural determination of craft displacement by Morse code translations; but the advantages of compact component parts and steady needle indication in the craft position galvanometer more than offset the elimination of the aural code facilities.

It will be readily apparent that the system above described possesses some similarity to the systems employing equal impulse durations in the two beams and requiring phase-detection receiving circuits. The inequality of the alternate transmission impulses in the two directive patterns, however, obviates the separate transmission and reception of a phase-reference signal, and makes possible the use of greatly simplified circuits for actuating the position-indicating galvanometer in accordance with the output of the receiver detector circuit. The continuous and efficient use of all of the generated radio-frequency transmitter power is accomplished in this system, as in the equal-impulse phase-detector systems, but this advantage is here enjoyed without the disadvantages of complexity of the phase-detection systems.

The receiving system of the present invention is lighter, simpler, more compact and more economical than the band-pass filter systems heretofore used with distinctive beam modulation frequencies, and moreover, the present invention is extremely tolerant of the modulation frequency. A variation of modulation frequency of 20%, e. g., is tolerated without objectionable results.

In the present invention, since the alternating voltage at the output circuit of the craft guidance radio receiver varies substantially linearly with displacement from course over an appreciable range of craft movement, and since the craft position galvanometer is substantially linearly responsive to the difference of rectified output voltages of two linear rectifying circuits, a substantially linear relation is established between craft displacement from course and craft positional indication, affording ideal information by which to operate the craft.

While the invention has been illustrated as employed for deflecting the needle of a position-indicating zero-center galvanometer, it will be readily apparent that the electrical "difference signal" applied to the galvanometer may be applied to other utilization devices, e. g., to a craft autopilot, for automatically controlling the operation of the craft along the course defined by the radio energy beams.

While the present invention has been illustrated in application to an instrument landing glide path system, it will be readily appreciated that it is equally applicable to an instrument landing localizer system, or to a radio range system for aiding ships or aircraft in navigating along a predetermined course about which the directive energy patterns or beams are symmetrically disposed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio position-defining or guidance system comprising means for transmitting radio-frequency energy alternately at an audible frequency rate in first and second radiation directivity patterns or beams, the transmission of energy in said first pattern or beam being characterized by time durations different from the transmission in said second pattern or beam, radio receiving means responsive to the energy transmitted in said two directivity patterns or beams for producing an alternating output voltage when signals of different strengths are received through said first and second directivity patterns or beams, and a pair of rectifying circuits coupled to said receiving means and each arranged to produce a direct voltage varying according to variation of said alternating output voltage, one of said rectifying circuits being a half-wave rectifying circuit arranged to produce a direct voltage varying substantially in proportion to the peak voltage amplitude of a selected polarity of said output voltage wave, each of said rectifying circuits being constituted of the grid-cathode conduction paths of triodes respectively, and current indicating means connected between the cathodes of said triodes.

2. Apparatus for determining the position of a craft relative to two directive patterns of alternate energy transmissions, the durations of energy transmissions in a selected one of said patterns being longer than the duration of the alternate transmissions in the other of said patterns, comprising: radiant-energy receiving means for receiving energy transmitted in said two directive patterns and producing a detected output signal varying in strength at the frequency of alternation of said patterns in accordance with the relative strength of energy received through said directive patterns, and a pair of opposed peak voltmeter circuits coupled to said receiving means to receive said detected output signal, the first of said peak voltmeter circuits being arranged to detect the positive peak strength and the second being arranged to detect the negative peak strength of alternating output voltage from said receiving means, said voltmeter circuits including triode electron discharge devices, and an indicating meter connected between the cathode leads of said triode devices, the difference of the positive and negative peak values of the alternating voltage providing an unambiguous measure of craft position relative to said two directive patterns.

3. Radio apparatus comprising radio receiving means including a detector; first and second peak voltmeter circuits; alternating-voltage coupling means coupling said first voltmeter to said receiving means for energizing said first voltmeter with voltage peaks of a first polarity and coupling said second voltmeter to said receiving means for energizing said second voltmeter with voltage peaks of the opposite polarity, plural triode means coupled to said first and second peak voltmeter circuits for comparing the detected values of peak voltages, and an indicating meter connected in the cathode leads of said triode means.

THOMAS M. FERRILL, JR.

(References on following page)

REFERENCES CITED

The following references are of record in the file of this patent:

UNITED STATES PATENTS

| Number | Name | Date |
|---|---|---|
| 2,226,366 | Braden | Dec. 24, 1940 |
| 2,271,534 | Bailey | Feb. 3, 1942 |
| 2,275,298 | Hugenholtz | Mar. 3, 1942 |
| 2,290,974 | Kramer | July 28, 1942 |
| 2,404,810 | O'Brien | July 30, 1946 |
| 2,410,117 | Weston | Oct. 29, 1946 |
| 2,418,284 | Winchel | Apr. 1, 1947 |
| 2,424,560 | Earp | July 29, 1947 |
| 2,431,317 | Earp et al. | Nov. 25, 1947 |

FOREIGN PATENTS

| Number | Country | Date |
|---|---|---|
| 441,370 | Great Britain | Jan. 17, 1936 |
| 809,447 | France | Dec. 12, 1936 |
| 862,819 | France | Dec. 16, 1940 |
| 857,582 | France | Apr. 22, 1940 |
| 984,834 | France | Mar. 20, 1944 |